Patented Jan. 1, 1929.

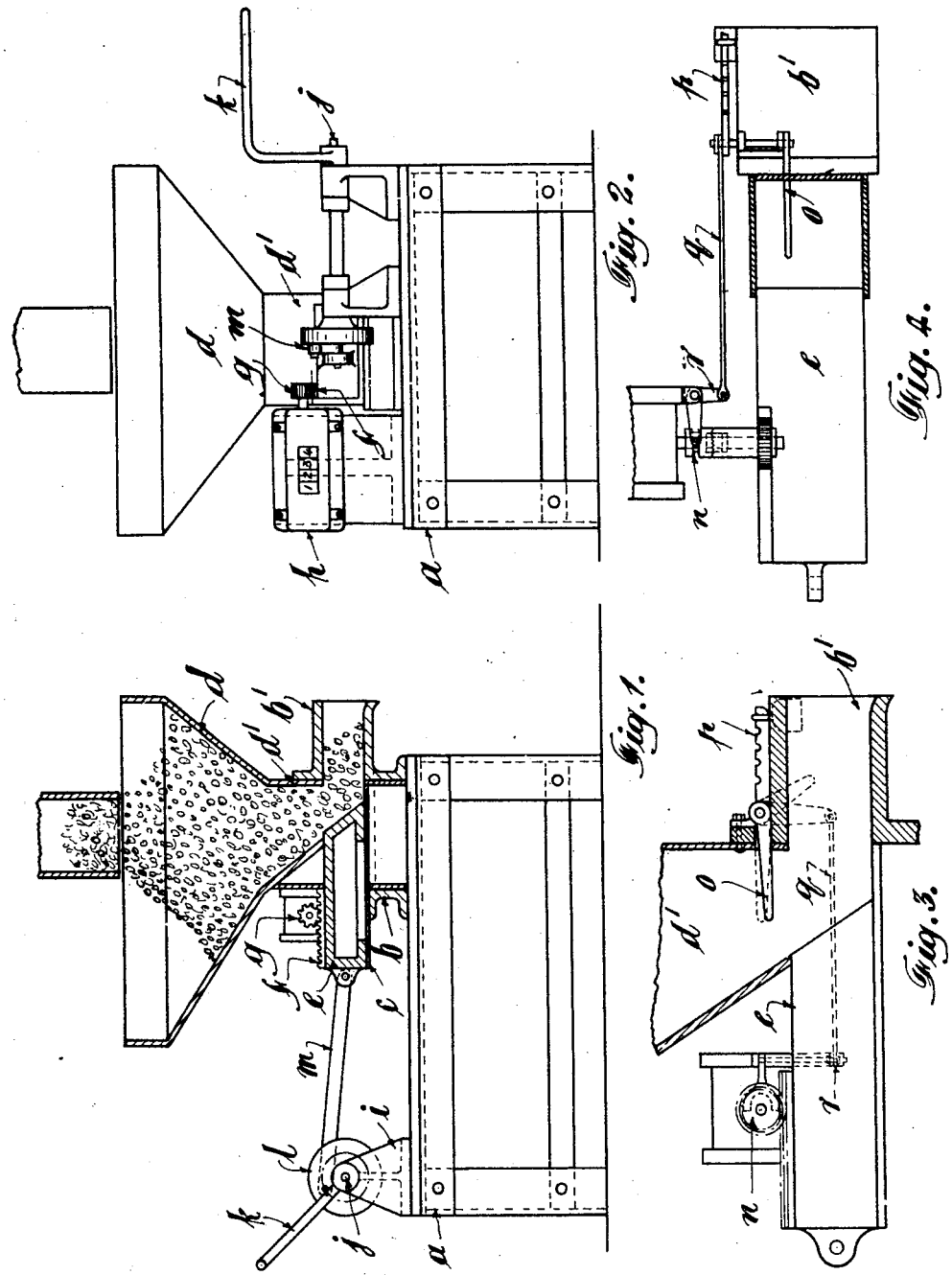

1,697,072

UNITED STATES PATENT OFFICE.

JAMES EDWARD LEA, OF MANCHESTER, ENGLAND.

APPARATUS FOR MEASURING VOLUMETRICALLY GRANULAR POWDERED MATERIAL.

Application filed September 22, 1925, Serial No. 57,923, and in Great Britain October 1, 1924.

This invention refers to improved apparatus for measuring volumetrically granular or powdered materials, such as small coal, ores, grain, sand, salt and the like hereinafter generically referred to as granular materials.

According to the invention, the improved apparatus comprises a bin or hopper for receiving the material to be measured, and a horizontal open-ended spout below said hopper, the spout, and bin or hopper being mounted on a framework, bench or table. Working on a slide plate below the hopper and into and out of the spout is a ram, connected to suitable power or hand-operating means and adapted to force the granular or other material falling in front of it through the spout. Alongside the hopper and supported on the framework, bench or table, or by the hopper, is a revolution counter, which is operably coupled to the ram, whereby the strokes of the ram in one direction are utilized to operate the counter, which being calibrated to indicate volume or weight, indicates the total quantity of material passed through the machine after any number of reciprocations of the ram.

To prevent the actuation of the counter when no material is passing through the machine, means may be provided for automatically declutching the counter from the driving gear when the hopper is empty.

Upon the accompanying drawings:—

Fig. 1 is a part longitudinal sectional elevation, and

Fig. 2 an end or front elevation.

Fig. 3 is a part sectional side view and

Fig. 4 a plan of a part of the machine showing means for declutching the counter when no material is passing through the machine.

In the example of the machine shown, the table $a$ is made of bars of metal bolted together to form the sides, stays and legs, and of a plate to form the top of the table. At one end of the table is a metal stand $b$ with one part formed as a rectangular spout $b^1$, and another part made level and fitted with a plate $c$. Above such stand and supported thereby is a sheet metal hopper $d$, the sides of the hopper sloping down and converging into a throat part $d^1$ equal in width to the width of the spout $b^1$. Slidably mounted on the plate $c$ and projecting through an opening in the lower part of the hopper is a metal ram $e$, the forward end of which is bevelled or sloped so as to allow the granular material to readily fall and completely fill the space in front of the ram, when the latter is retracted. On top of the ram and near to one side is a toothed rack $f$, and overhanging the ram and meshing with the rack is the free-wheel or one-way pinion $g$ of a revolution counter $h$. The counter is enclosed within a metal casing mounted on the machine table, and is provided with a window through which the counting dials, calibrated in cubic measurement or weight, may be seen and read off.

At that end of the table $a$ furthest from the delivery spout $b^1$ are bearing brackets $i$, which carry a cross shaft $j$ fitted at one end with a handle $k$ (or power pulley) and at the other end with a disc $l$. To a pin on said disc, eccentrically arranged, is one end of a connecting rod $m$, which at its other end is hingedly connected to the rear end of the ram $e$.

With the hopper supplied and filled with granular material, which flows by gravity downwards and fills the spout $b^1$ the turning of the handle $k$ operates the ram $e$ to reciprocate it to and fro, and at each forward reciprocation (with the stroke of the ram constant, as also the cross sectional area of the spout), deliver a fixed quantity or volume of granular material through the spout $b^1$. During each forward reciprocation of the ram, the rack $f$ rotates the pinion $g$ and imparts a proportional movement to the counter, which latter indicates the total quantity of material delivered.

The motion of the free-wheel pinion $g$ may be imparted to the counter $h$ through a clutch $n$ (see Figs. 3 and 4), and such clutch may be controlled by a "feeler" $o$, and weighted lever $p$, the arrangement being such that so long as there is material in the hopper, the "feeler" will be depressed and the clutch $n$ held in engagement with the pinion $g$, but so soon as the material falls below the "feeler" the weighted lever $n$, through link $q$ and lever $r$, declutches the pinion, and no further measurement takes place until the hopper is refilled.

Instead of the "feeler" $o$ being in the throat of the hopper it may be in the spout $b^1$.

The improved machine is specially adapted for measuring fuel in a boiler house, say prior to use in a hand-fired boiler, or on its way to the mechanical stokers of a battery of boilers. It may be a fixture, or it may be fitted with wheels to allow of its being wheeled about, or it may be suspended and arranged to run on overhead rails, receiving its supply at one point and delivering measured quantities where required.

What I claim is:—

1. In apparatus for measuring volumetrically granular materials comprising a reciprocating ram, a passage for delivering the material thereto and counter mechanism operably connected to the ram, in combination means for rendering the counter mechanism inoperative when the supply of material ceases, said means comprising clutch mechanism arranged in the drive for the said counter mechanism and a clutch-operating member therefor arranged in the said passage so as to be operated by the material in the passage for effecting and maintaining the operative engagement of the said clutch mechanism, as set forth.

2. In apparatus for measuring volumetrically granular materials comprising a reciprocating ram, a passage for delivering the material thereto and counter mechanism operably connected to the ram, in combination, means for rendering the counter mechanism inoperative when the supply of material ceases, said means comprising clutch mechanism arranged in the drive for the said counter mechanism and a clutch operating member therefor arranged in the said passage so as to be operated by the weight of the material in the passage for effecting and maintaining the operative engagement of the said clutch mechanism, as set forth.

3. In apparatus for measuring volumetrically granular materials comprising a reciprocating ram, a passage for delivering the material thereto and counter mechanism operably connected to the ram, in combination a counter having a rotatable spindle, a clutch member slidably mounted thereon and constrained to rotate therewith, a pinion member rotatably mounted on the said shaft having a pinion and clutch parts, to co-act with the clutch member, associated with the pinion through one-way mechanism, a rack on the said ram with which the said pinion engages, a counter-balanced lever arranged with one end projecting into the said passage, and lever mechanism connecting said counterbalanced lever to the clutch member to slide it into engagement with the said clutch parts when the counterbalanced lever is depressed by the material in the passage, as set forth.

In testimony whereof I have signed my name to this specification.

JAMES EDWARD LEA.